(12) United States Patent
Gutierrez-Castaneda

(10) Patent No.: US 8,326,471 B2
(45) Date of Patent: Dec. 4, 2012

(54) METHODS OF DETECTING MISALIGNMENT OF POINTS BELONGING TO AN AIRCRAFT FLIGHT PLAN

(75) Inventor: Manuel Gutierrez-Castaneda, Toulouse (FR)

(73) Assignee: Thales, Neuilly sur Seine (FR)

( * ) Notice: Subject to any disclaimer, the term of this patent is extended or adjusted under 35 U.S.C. 154(b) by 1167 days.

(21) Appl. No.: 12/178,851

(22) Filed: Jul. 24, 2008

(65) Prior Publication Data

US 2009/0030565 A1    Jan. 29, 2009

(30) Foreign Application Priority Data

Jul. 24, 2007 (FR) .................................. 07 05378

(51) Int. Cl.
*G01C 21/24* (2006.01)
(52) U.S. Cl. .......................................................... 701/3
(58) Field of Classification Search .................. 701/3, 4, 701/9, 14
See application file for complete search history.

(56) References Cited

U.S. PATENT DOCUMENTS

2004/0111192 A1    6/2004    Naimer et al.

FOREIGN PATENT DOCUMENTS

| EP | 1757520 | 2/2007 |
| FR | 2895074 | 6/2007 |
| WO | WO0150087 | 7/2001 |

*Primary Examiner* — John Nguyen
*Assistant Examiner* — Rodney P King
(74) *Attorney, Agent, or Firm* — Lowe, Hauptman, Ham & Berner LLP

(57) ABSTRACT

A method of detecting the misalignment of a first point (1) in space is disclosed. The method includes a trajectory of an aircraft flight plan, wherein the flight plan has two points (2, 3) in succession and preceding the first point (1) and two points (4, 5) in succession and subsequent to the first point (1), A first acute angle ($\theta_1$) is calculated which is formed by a first segment (LEG-1) joining the points (2, 3) and a second segment joining the third (3) and the fourth (4) points. A second acute angle ($\theta_2$) is calculated which is formed by the second segment and a third segment (LEG-4) joining the fourth (4) and the fifth (5) points. A polygon is calculated which is dependent on a first distance (DH) defined between the fourth point (4) and the straight line including the first segment (LEG-1) and on a second distance (DD) defined between the projection (4') of the fourth point (4) on the straight line comprising the first segment (LEG-1) and the third point (3).

15 Claims, 2 Drawing Sheets

METHODS OF DETECTING MISALIGNMENT OF POINTS BELONGING TO AN AIRCRAFT FLIGHT PLAN

RELATED APPLICATIONS

The present application is based on, and claims priority from, French Application Number 07 05378, filed Jul. 24, 2007, the disclosure of which is hereby incorporated by reference herein in its entirety.

TECHNICAL FIELD

The present invention relates to a method of detecting misalignment of points, called "waypoints", of an aircraft flight plan. It applies more particularly to onboard flight management means. The inventive method is generally applied before a flight mission.

BACKGROUND OF THE INVENTION

Currently, when a member of the crew of an aircraft defines a flight plan, he can either manually define each of the waypoints of the trajectory or define all of a trajectory predefined in the flight management of the aircraft. The waypoint is notably defined by a latitude and a longitude corresponding to its position in space. The waypoints are generally stored in a navigation database. The flight management of an aircraft uses the navigation database, in particular the waypoint data, in order to define the trajectory of the aircraft. The flight management of an aircraft is generally called FMS, standing for "Flight Management System".

Currently, the flight plan makes it possible notably to check that the aircraft is adhering to the planned path in automatic mode. These days, if there is an inconsistency between the position of a waypoint and the trajectory of the flight plan, for example if a waypoint is abnormally distanced from the trajectory of the flight plan, there is no means envisaged to warn the crew of this inconsistency. It may in this case be the result of a desire to fly a particular path comprising one or more misalignments desired by the crew, but it can also be the result of human error in defining the waypoints in the flight plan.

Because of this, in the case of a misalignment of a waypoint that is not desired by the crew, the latter therefore being the result of human error, the current solutions do not eliminate ambiguity or inconsistency from the flight plan.

The major drawback of the absence of misalignment control lies in that a human error can occur when entering a flight plan into the FMS. Moreover, fuel consumption is greater and travel times longer.

SUMMARY OF THE INVENTION

In all cases, in the definition of a flight plan in the FMS, the invention proposes to overcome the abovementioned drawbacks, notably to warn the crew of the misalignment of a waypoint in the flight plan according to pre-established and configurable criteria. To this end, the subject of the invention is a method of detecting the misalignment of the points of a flight plan, provided that it is known to the crew, from their latitude and longitude and from certain parameters associated with the trajectory made up of five consecutive points of the flight plan.

In the case of the detection of a misalignment of a waypoint in the flight plan, the FMS advantageously proposes to issue a message to the crew.

Moreover, the improvement to the plots of the trajectories can result in fuel consumptions and paths flown being reduced.

Advantageously, the inventive method covers the characteristics of the claims.

Advantageously, the method of detecting the misalignment of a first point in space included in a trajectory of an aircraft flight plan, the flight plan comprising a second and a third point in succession and preceding the first point and a fourth and a fifth point in succession and subsequent to the first point, each point being identified by a latitude and longitude, comprises:
   the calculation of a first acute angle formed by a first segment joining the second and the third points and a second segment joining the third and the fourth points;
   the calculation of a second acute angle formed by the second segment and a third segment joining the fourth and the fifth points;
   the comparison of the first and second angles respectively to a first maximum reference value and to a second maximum reference value;
   the generation of an indication, from flight management means, concerning the context of the first point, corresponding to a turn context if the first or the second angle exceeds its own maximum reference value.

Advantageously, the first and the second angles are less than their own maximum reference value, the method then comprises the calculation of a polygon dependent:
   on a first distance (DH) defined between the fourth point and the straight line comprising the first segment;
   on a second distance (DD) defined between the projection of the fourth point on the straight line comprising the first segment and the third point.

Advantageously, a message indicates to the crew the misalignment of the first point, when the latter does not belong to the navigation database.

Advantageously, the polygon comprises six sides.

Advantageously, a first side is perpendicular to the first segment and a second side is perpendicular to a third segment.

Advantageously, a first side cuts the first segment at a third distance from the third point and a second side cuts the third segment at this same third distance from the fourth point.

Advantageously, a first and a second peak of the polygon are defined at the ends of the first side at a same fourth distance (Y) from the first segment.

Advantageously, a third and a fourth peak of the polygon are defined at the ends of the second side at the fourth distance (Y) from the third segment.

Advantageously, the first peak is the peak of a third side included in a straight line forming a third angle with the first segment.

Advantageously, the second peak is the peak of a fourth side included in a straight line forming a fourth angle of the same value and of reverse direction to the third angle.

Advantageously, the third peak is the peak of a fifth side included in a straight line forming a fifth angle (180°-α) with the third segment, the fifth angle being additional to the third angle.

Advantageously, the fourth peak is the peak of a sixth side included in a straight line forming a sixth angle with the third segment, the sixth angle being of reverse direction and of absolute value equal to the fifth angle.

Advantageously, a fifth peak is the intersection of the third and of the fifth sides and a sixth peak is the intersection of the fourth and of the sixth sides.

Advantageously, the calculation of misalignment of a point of the flight plan is performed for each of the points of the flight plan.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
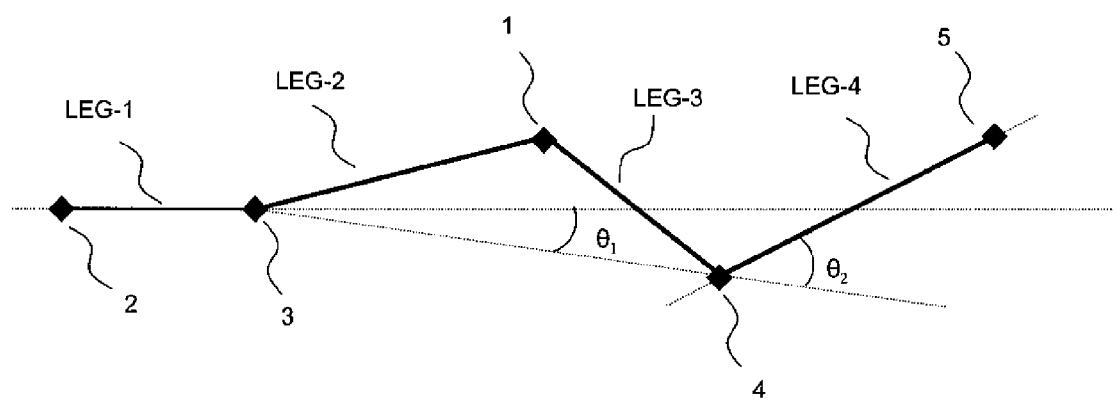
FIG. 1: the test angles of five consecutive waypoints corresponding to a turn of the aircraft in a flight plan.

FIG. 1 illustrates five consecutive waypoints (2, 3, 1, 4, 5) of a flight plan, forming a portion of the overall trajectory of the flight plan. The calculation of the misalignment of a waypoint according to the inventive method is performed on a point 1, for which the two preceding waypoints (2, 3), the point 1 and the two waypoints (4, 5) subsequent to the point 1 are known.

A portion of trajectory between two successive points of a flight plan is called a "leg" to use the aeronautical terminology. The portion of trajectory comprising five successive waypoints of a flight plan therefore comprises four successive legs. In the example of the figure, a first leg, LEG-1, is formed by the segment [2, 3], a second leg, LEG-2, is formed by a segment [3, 1], a third leg, LEG-3, is formed by a segment [1, 4], a fourth leg, LEG-4, is formed by a segment [4, 5].

It is necessary to know the latitude and the longitude of each waypoint of the portion of the trajectory in order to calculate two angles ($\theta_1$, $\theta_2$), the knowledge of these two angles making it possible to initialize the inventive method on portions of the flight plan or over all of the flight plan. The two angles $\theta_1$ and $\theta_2$ are angles that make it possible to exclude cases of turns of the aircraft in the flight plan. Since these angles are measured previously over the sequence of all the waypoints, they make it possible to define two maximum values beyond which there is no need to initialize the method.

The latitude and the longitude of each waypoint are present in the navigation database and can be easily extracted into the FMS application.

The invention proposes to define a waypoint misalignment criterion. One possible embodiment proposes to send a message to the crew if this one criterion is not observed.

The inventive method therefore defines two first angles which, depending on their value, this value being compared to a reference value, make it possible to test the misalignment criterion on a waypoint of the flight plan.

A first test acute angle $\theta_1$ between the straight line comprising the LEG-1 and the straight line segment [3, 4] and a second test acute angle $\theta_2$ between the straight line comprising the segment [3, 4] and the straight line comprising LEG-4.

The method detects that a waypoint of a flight plan corresponds to a point of a turn if the first angle $\theta_1$ is greater than a maximum reference value $\theta_{1max}$ and when the second angle $\theta_2$ is greater than a maximum reference value $\theta_{2max}$.

This detection is performed, in one embodiment, by the calculation means of the FMS.

One advantage is that these test criteria ($\theta_1$, $\theta_2$) depend only on the positions of the two points preceding and following the point for which the misalignment is to be tested. The calculation is therefore simple to perform and makes it possible to exclude cases of turns where a misalignment can be considered to be normal.

When the values of $\theta_1$ and $\theta_2$ are respectively less than $\theta_{1max}$ and $\theta_{2max}$, the inventive method makes it possible to then establish a misalignment criterion by defining a polygon within which the point 1 should be contained.

In one example, the defined polygon comprises six sides and its characteristics are defined in one exemplary embodiment detailed hereinafter in the description.

Figure 2:
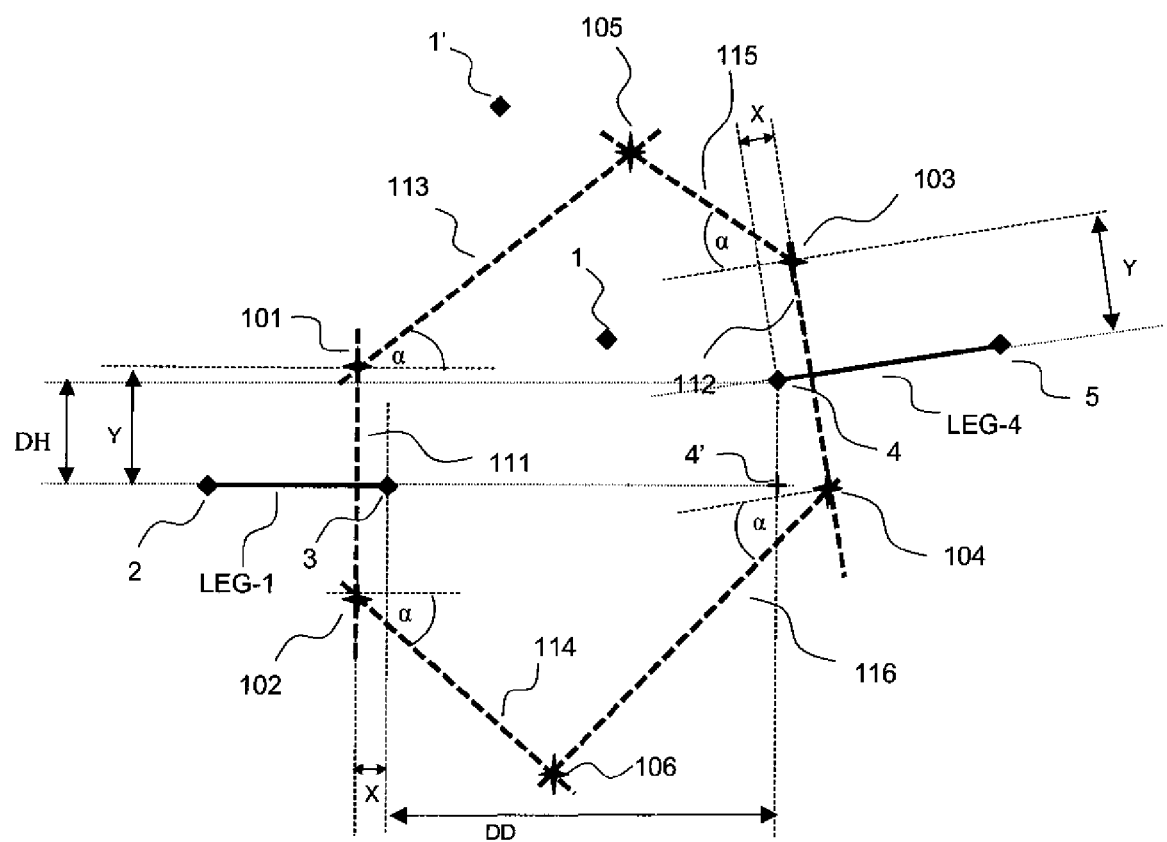
FIG. 2: the misalignment polygon of five consecutive waypoints.

FIG. 2 represents the five successive waypoints (2, 3, 1, 4, 5) of the portion of trajectory taken from a flight plan.

The inventive method proposes to define two distances DD and DH deriving from the geometry of the waypoints (2, 3, 4, 5) that make it possible to express certain parameters of the polygon to be constructed.

DH is the distance between the waypoint 4 and the straight line including the LEG-1. Moreover DD is the distance between the waypoint 2 and the projection 4' of the waypoint 4 on the straight line comprising the LEG-1. These two distances depend only on the waypoints (2, 3, 4).

The inventive method proposes, moreover, to define a first side 111 perpendicular to the LEG-1 and joining the waypoints 2 and 3 a second side 112 perpendicular to the LEG-4 joining the waypoints 4 and 5.

A first parameter is defined which is a first distance X. This distance X makes it possible to know the points of intersection between on the one hand the side 111 and the LEG-1 and on the other hand between the side 112 and the LEG-4. Each point of intersection is calculated respectively from the waypoints 3 and 4, the two sides 111, 112 respectively cutting the LEG-1 and LEG-4 at a distance X from the waypoints 3 and 4.

The distances between on the one hand the point 3 and the side 111 and on the other hand between the waypoint 4 and the side 112 are equal to the distance X.

A second parameter is defined which is a second distance Y. This distance makes it possible to know the ends of the two sides 111 and 112 positioned previously, the ends of the sides being peaks of the polygon. The distance Y between the first peak 101 and the LEG-1 is equal to the distance between the peak 102 and the LEG-1.

Similarly, the distance between the peak 103 and the LEG-4 and the distance between the peak 104 and the LEG-4 are equal to the distance Y.

In the detailed example of the description, the distances X and Y are functions of the parameters $\theta_1$, $\theta_2$, DD and DH.

The inventive method then defines an angle $\alpha$ which makes it possible to define the orientation of the other four sides 113, 114, 115 and 116 of the polygon.

In one embodiment, the angle $\alpha$ is a function of the parameters $\theta_1$, $\theta_2$, DD and DH.

Each of the sides 113 and 114 is oriented at an angle $\alpha$ respectively its opposite respectively to the straight line perpendicular to the side 111 and passing through the peak 101 and to the straight line perpendicular to the side 111 and passing through the peak 102.

Similarly, each of the sides 115 and 116 is oriented at an angle additional to the angle α, that is (180°-α), respectively its opposite relative respectively to the straight line perpendicular to the side 112 and passing through the peak 103 and to the straight line perpendicular to the side 112 and passing through the peak 104.

The peak 105 is defined by the point of intersection of the sides 113 and 115 and the peak 116 by the point of intersection of the sides 114 and 116.

The duly formed polygon defines an area in which the waypoint 1 should be contained so as not to be considered to be misaligned.

When the waypoint 1 is not contained in the polygon, it occupies, for example, the position of the waypoint 1', the inventive method uses a visual or audible message to signal the misalignment of a waypoint.

The method makes it possible to test a misalignment criterion from $\theta_{1max}$, $\theta_{2max}$ and the characteristics of the polygon. If the misalignment criterion is not observed, then a message can be transmitted to the crew indicating the misalignment.

One embodiment makes it possible to set $\theta_{1max}$, $\theta_{2max}$ at 20°. Beyond this value, the misalignment criterion is not tested.

The inventive method makes it possible to repeat the calculation of the misalignment of a waypoint of a flight plan for all the waypoints contained in the flight plan provided that there are two preceding waypoints and two succeeding waypoints.

In one embodiment, the method makes it possible to inform, by means of the FMS via a display screen, the result of the analysis of the detection of the misalignment of the waypoints of the flight plan.

The misaligned waypoints are then signalled, and the crew can acknowledge these messages and check the sequence of the waypoints.

A summary is presented to the crew indicating the detail of a portion of the flight plan containing the misaligned waypoint if such is the case, in particular characteristics such as the coordinates of the waypoints preceding the misaligned point and the waypoints succeeding it.

The main advantage of the invention is that it provides the crew with a summary of the waypoints of a flight plan, aiming to inform them of any misalignment of waypoints. The crew can then check the sequence and thus avoid entering a wrong sequence of waypoints into the FMS.

The algorithm therefore makes it possible to optimize a flight plan by observing a misalignment of a waypoint.

Moreover, the inventive method makes it possible to modify input data X, Y and α in order to adjust an optimal polygon by simply modifying the relationships between these data items and the geometrical parameters of the portion of trajectory $\theta_1$, $\theta_2$, DD and DH.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of detecting the misalignment of a first point in space included in a trajectory of an aircraft flight plan, said aircraft having a Flight Management System (FMS) the flight plan comprising a second and a third point in succession and preceding the first point and a fourth and a fifth point in succession and subsequent to the first point, each point being identified by a latitude and longitude, the method comprising the steps of:
   calculating, using said FMS, a first acute angle formed by a first segment joining the second and the third points and a second segment joining the third and the fourth points;
   calculating, using said FMS, a second acute angle formed by the second segment and a third segment joining the fourth and the fifth points;
   comparing the first and second angles respectively to a first maximum reference value and to a second maximum reference value; and
   generating, using said FMS, an indication concerning the context of the first point:
      corresponding to a turn context, if the first or the second angle exceeds its own maximum reference value, and in which the calculation of a misalignment of the first point is not performed;
      corresponding to a context in which the misalignment of the first point is calculated, if the first and the second angles are respectively less than their maximum reference value, the misalignment detection method comprising a defining a polygon having an area in which the absence of the first point indicates misalignment of said first point.

2. The method according to claim 1, wherein if the first and the second angles are less than their own maximum reference value the method then comprises the calculation of a polygon dependent:
   on a first distance defined between the fourth point and the straight line comprising the first segment;
   on a second distance defined between the projection of the fourth point on the straight line comprising the first segment and the third point.

3. The method according to claim 1, wherein a message indicates to the crew the misalignment of the first point, when the latter does not belong to the navigation database.

4. The method according to claim 2, wherein the polygon comprises six sides.

5. The method according to claim 4, wherein the polygon comprises a first side perpendicular to the first segment and a second side perpendicular to a third segment.

6. The method according to claim 5, wherein a first side cuts the first segment at a third distance from the third point and that a second side cuts the third segment at this same third distance from the fourth point.

7. The method according to claim 6, wherein a first and a second peak of the polygon are defined at the ends of the first side at a same fourth distance from the first segment.

8. The method according to claim 7, wherein a third and a fourth peak of the polygon are defined at the ends of the second side at the fourth distance from the third segment.

9. The method according to claim 8, wherein the first peak is the peak of a third side included in a straight line forming a third angle with the first segment.

10. The method according to claim 9, wherein the second peak is the peak of a fourth side included in a straight line forming a fourth angle of the same value and of reverse direction to the third angle.

11. The method according to claim 10, wherein the third peak is the peak of a fifth side included in a straight line forming a fifth angle with the third segment, the fifth angle being additional to the third angle.

12. The method according to claim 11, wherein the fourth peak is the peak of a sixth side included in a straight line forming a sixth angle with the third segment, the sixth angle being the reverse direction and of absolute value equal to the fifth angle.

13. The method according to claim 12, wherein a fifth peak is the intersection of the third and of the fifth sides.

14. The method according to claim 12, wherein a sixth peak is the intersection of the fourth and of the sixth sides.

15. The method according to claim 14, wherein the calculation of misalignment of a point of the flight plan is performed for each of the points of the flight plan.

* * * * *